W. J. COOK.
MACHINE FOR SPREADING FERTILIZER.
APPLICATION FILED JULY 11, 1919.
1,328,618. Patented Jan. 20, 1920.
4 SHEETS—SHEET 1.
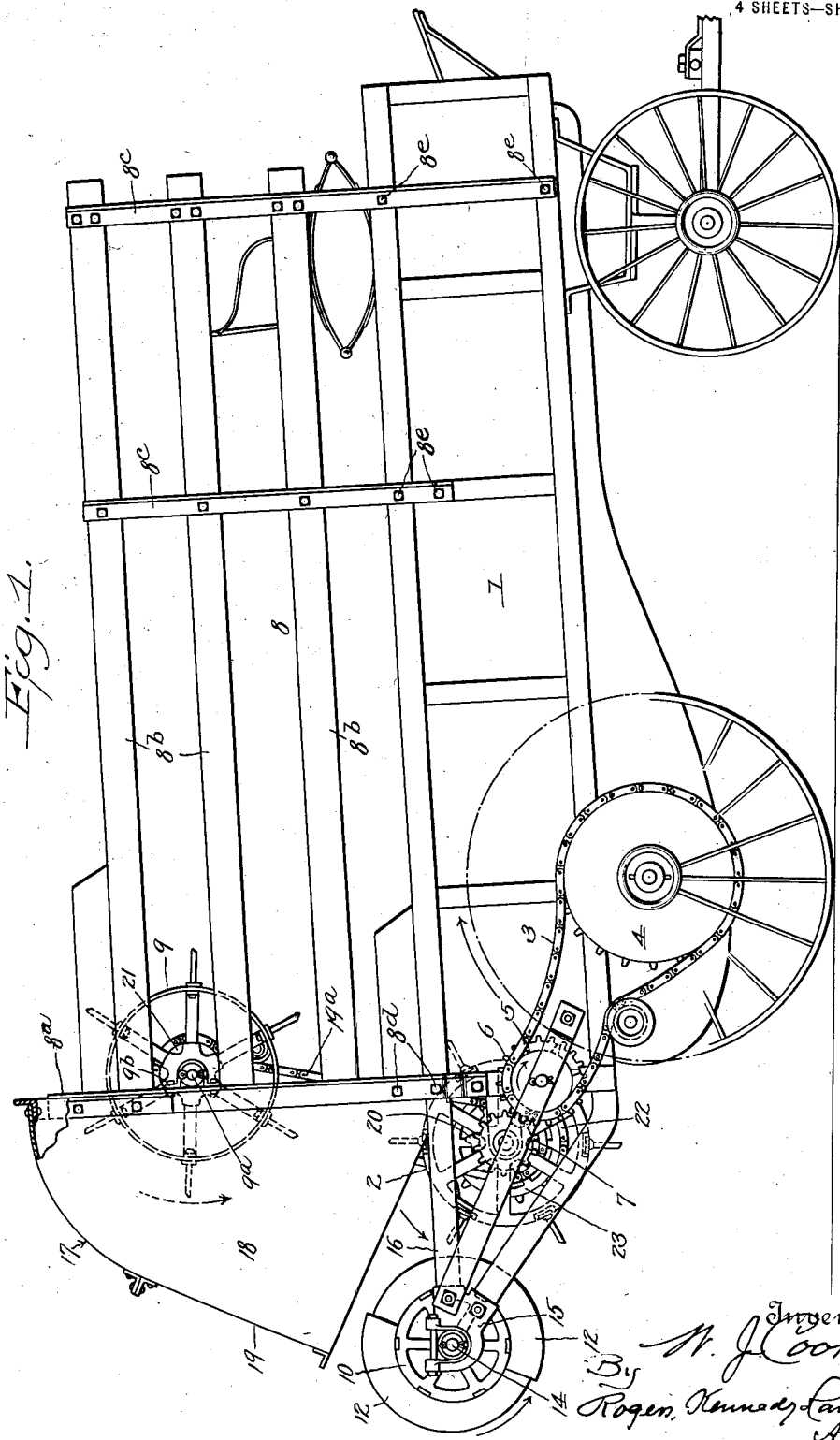

W. J. COOK.
MACHINE FOR SPREADING FERTILIZER.
APPLICATION FILED JULY 11, 1919.
1,328,618.
Patented Jan. 20, 1920.
4 SHEETS—SHEET 2.
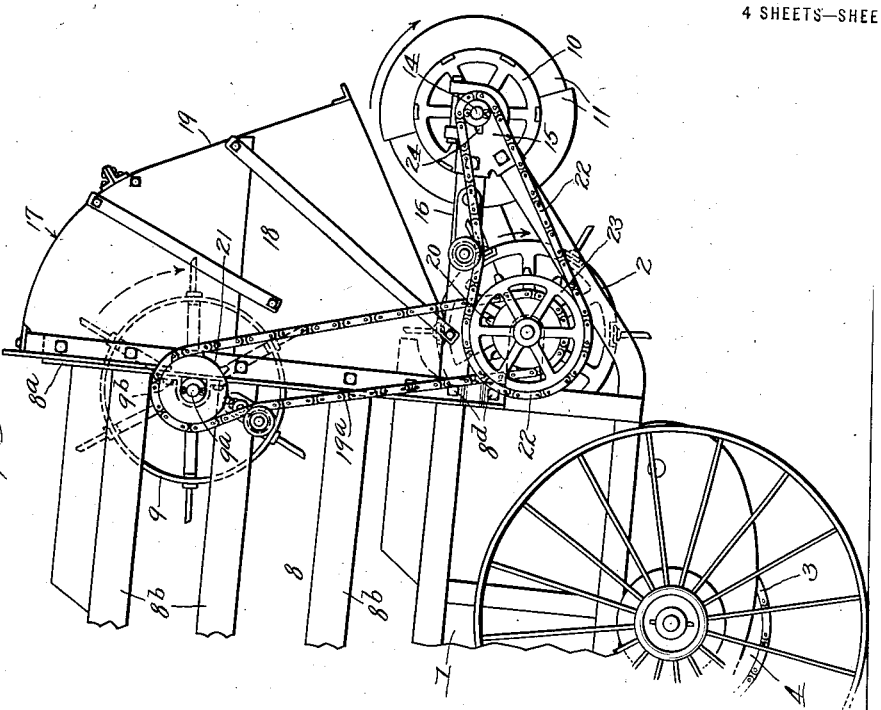
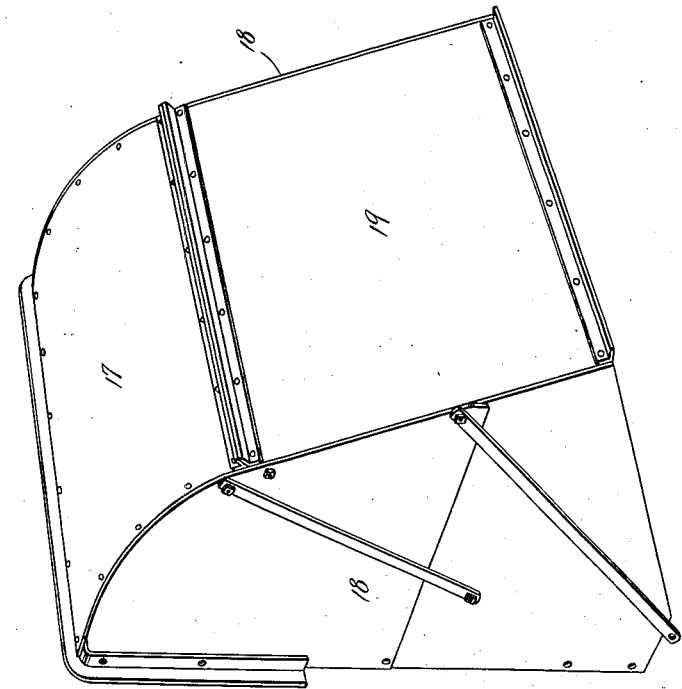

W. J. COOK.
MACHINE FOR SPREADING FERTILIZER.
APPLICATION FILED JULY 11, 1919.

1,328,618.  Patented Jan. 20, 1920.
4 SHEETS—SHEET 3.

Inventor
W. J. Cook
By his Attorneys
Rogers, Kennedy, Campbell

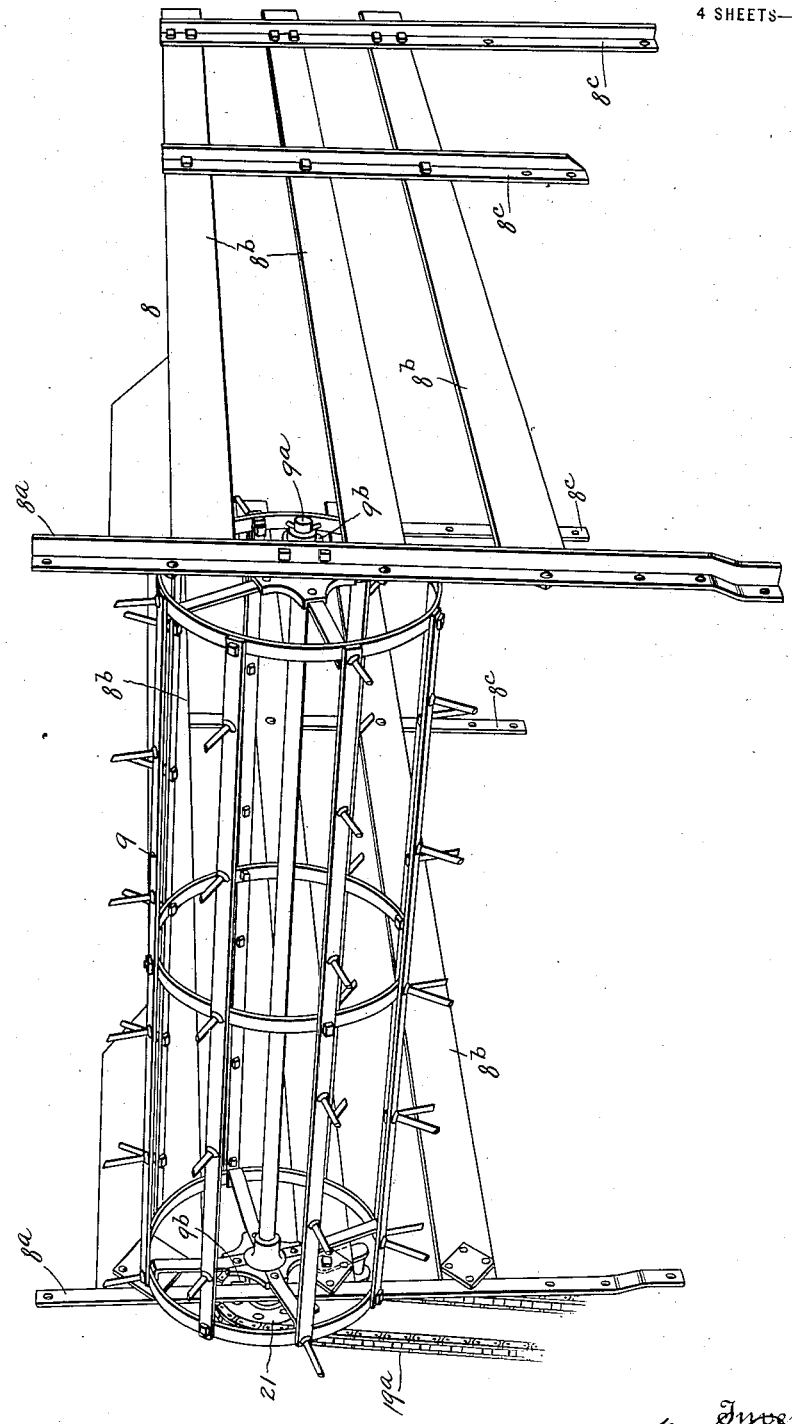

UNITED STATES PATENT OFFICE.

WILLARD J. COOK, OF STOUGHTON, WISCONSIN, ASSIGNOR TO MOLINE PLOW COMPANY, A CORPORATION OF ILLINOIS.

MACHINE FOR SPREADING FERTILIZER.

1,328,618.  Specification of Letters Patent.  Patented Jan. 20, 1920.

Application filed July 11, 1919. Serial No. 310,116.

*To all whom it may concern:*

Be it known that I, WILLARD J. COOK, a citizen of the United States, residing at Stoughton, in the county of Dane and State of Wisconsin, have invented certain new and useful Improvements in Machines for Spreading Fertilizer, of which the following is a specification, reference being had therein to the accompanying drawing.

This invention relates to machines for spreading fertilizer, and the invention has reference more particularly to the type of machine designed for spreading manure, and comprising usually a wagon body to contain the manure, a beater mechanism at the rear end of the body to act on a body of material and distribute the same, and means for feeding the body of material rearwardly to the action of the beater mechanism. In certain machines of this type, the beater mechanism delivers the material directly to the ground, while in other types there is a special spreading device employed which receives the material from the beater mechanism and spreads the same widely over the ground. My invention is directed more particularly to improvements in machines of this latter description, although as to certain of its features, it has a wider application; and the invention consists of certain improvements designed to adapt the machine for spreading straw instead of the more solid forms of fertilizer, such as manure.

In accordance with my invention, I provide a rack frame for the wagon body, which extends above the same so as to increase its holding capacity and make it available for holding more bulky material, such as straw. This frame has mounted on it at its rear end, a horizontal rotary beater cylinder which is spaced some distance above the usual lower beater cylinder so that the body of straw fed rearwardly by the usual feeding mechanism of the machine, is acted on at two points at the upper and lower portions of the body, whereby the straw loosened and detached at these points will be received by the spreader mechanism and spread widely over the surface of the ground. To cause the straw from the two beaters to be delivered to the spreading mechanism with certainty, I provide a hood or shield which extends at the sides and rear of the upper beater in such position that the straw distributed by the two beaters will be deflected by the hood and caused to fall upon the spreading device. This hood also serves to prevent the wind from interfering with the proper delivery of the straw to the spreading device.

In the accompanying drawings:

Figure 1 is a side elevation of my improved machine.

Fig. 2 is a similar view from the opposite side of machine.

Fig. 4 is a perspective view of the portable rack frame, and the beater cylinder mounted therein, the same being removed from the machine.

Fig. 6 is a perspective view of the hood removed from the machine.

Figure 3:
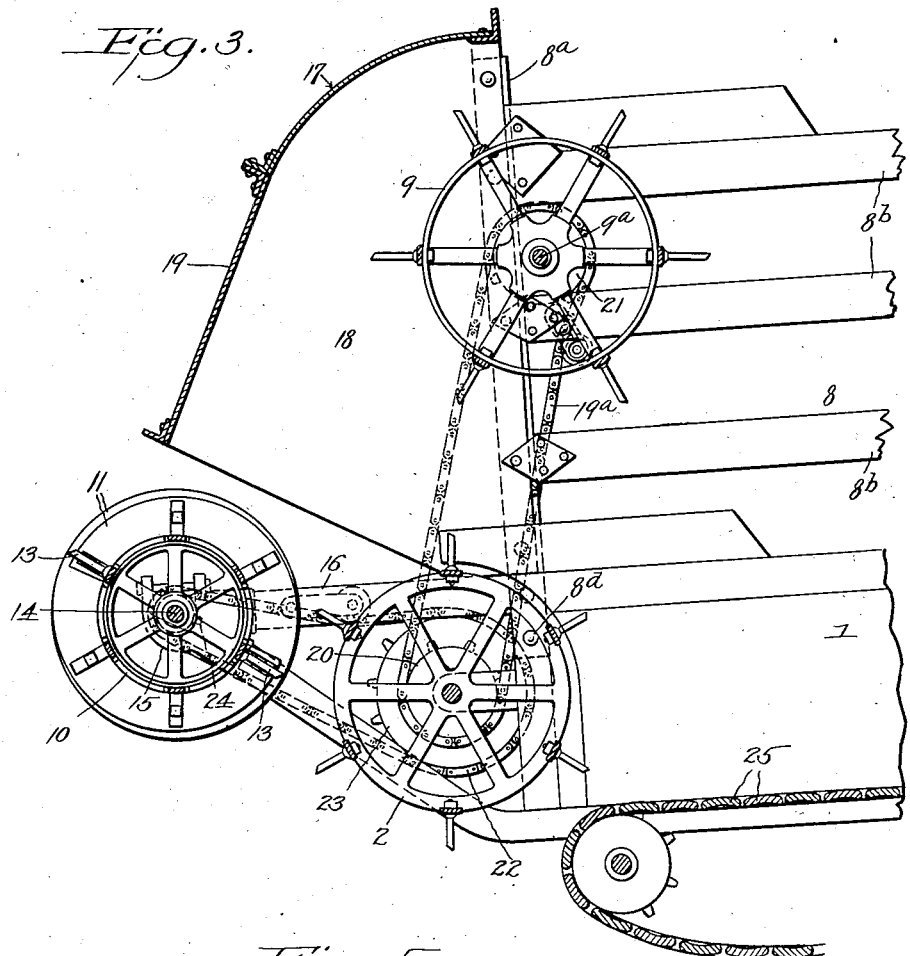
Fig. 3 is a longitudinal sectional elevation through the rear portion of the machine.
Figure 5:
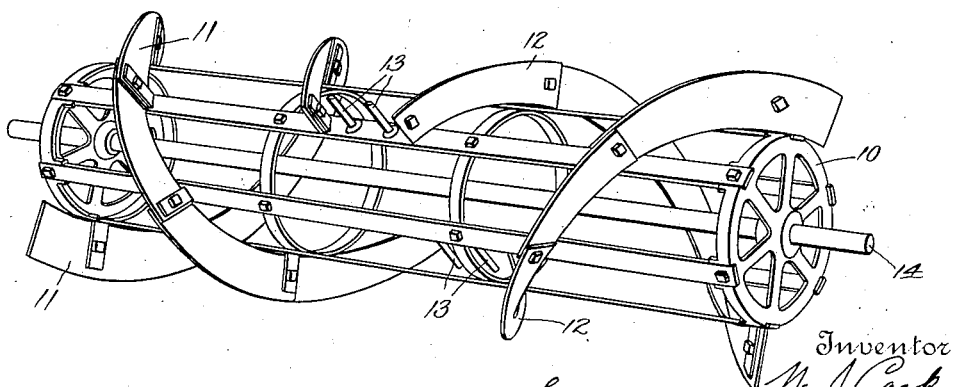
Fig. 5 is an elevation of the spreading drum.

Referring to the drawings:

1 designates the wagon body in the rear open end of which is mounted a horizontal rotary beater cylinder 2 carried by a horizontal shaft mounted in suitable bearings on the body. This beater cylinder is operated from the ground wheel at one side of the machine by means of a sprocket chain 3 which passes over a sprocket wheel 4 carried by the ground wheel and over a sprocket wheel 5 rotatably mounted on the side of the body. The sprocket wheel 5 has fixed to it a pinion 6 which engages a pinion 7 fixed to the shaft of the beater cylinder, whereby in the advance of the machine, the beater cylinder will be rotated as usual in the direction of the arrow as shown in Fig. 2. 8 designates a slatted rack frame which is applied to the wagon body so as to extend a considerable distance above the same, thereby forming continuations of the sides of the body and correspondingly increasing its holding capacity. The purpose of this frame is to enable the machine to hold the more bulky material to be distributed, such as straw. This slatted frame in the present instance comprises the two rear uprights $8^a$ and side rails or bars $8^b$, which bars are connected together at their rear ends by the uprights and are connected together near their forward ends by vertical bars $8^c$, the construction producing a unitary slatted frame structure which is applied to the wagon body, preferably in a detachable manner by means of bolts $8^d$ and $8^e$ extending respectively through the uprights $8^a$ and bars 8ᶜ and fastening the same firmly to the wagon body.

9 designates an upper beater cylinder carried by a shaft 9ᵃ which is mounted in suitable bearings 9ᵇ fixed to the uprights 8ᵃ near their upper ends. This cylinder is rotated in the same direction as the lower beater cylinder 2, in the manner to be more particularly described hereinafter, and the two cylinders are so positioned that they will act on the upper and lower portions of the load of material as the latter is fed rearwardly, and in their actions, portions of the material will be loosened and detached from the body and delivered to the action of a spreading device 10 which extends transversely of the machine in rear of the lower beater cylinder. The function of this spreading device is to spread the material broadcast over a wide area as the machine advances. The spreading device in the present instance is in the form of a hollow slatted drum, having fixed to its periphery, two sets of respectively right and left hand spiral blades 11 and 12, tapered from their outer to their inner ends, with the blades of each set extending from the outer ends of the drum inwardly toward each other spirally, and spaced apart at the inner ends, at which points the drum has fixed to it pairs of pins 13 which project from the drum in the spaces between the inner ends of the blades. As a result of this specific construction of the spreader drum, the material delivered to the same by the beater cylinders, will be spread and distributed over a wide area in a uniform and even manner. This beater drum is carried by shaft 14 which is mounted at its ends to rotate in bearings 15 on the rear ends of bracket arms 16 having their forward ends firmly fixed to the sides of the wagon body at its rear end, the drum being supported with its axis substantially in horizontal alinement with the axis of the lower beater cylinder. It is rotated in the same direction as that of the beater cylinders by the means presently to be described.

In order that the material detached from the load by the two beater cylinders, will be directed with certainty onto the spreading drum, and in order that its passage to the spreading drum there will be no liability of it being deflected by the wind, I provide a hood or shield 17. This hood comprises two side walls 18 fixed at the forward edges to the uprights 8ᵃ, and a rear wall 19 connected to the rear edges of the side walls, the upper portion of the rear wall being curved rearwardly and downwardly, and its lower portion sloping rearwardly. The position of this hood is such that it incloses the upper beater at its sides and rear, and it terminates at its lower end some distance above the spreader drum, so that a sufficient space is left beween the drum and the rear wall of the hood to permit the proper discharge of the straw by the spreading drum, while preventing the passage of unduly large masses of the material. The relation of the walls of the hood to the upper and lower beaters and spreading drum is such that the material loosened from the load by the beaters, will be thrown upwardly and backwardly against the rear wall which will act in connection with the side walls to direct the material with certainty downwardly onto the spreading drum. A further function of the hood is to prevent the wind from interfering with the proper passage of the material to the spreader drum, the side and end walls of the hood completely inclosing the space through which material passes from the beaters to the drum.

The upper beater cylinder is rotated from the lower beater cylinder by means of a sprocket chain 19ᵃ which passes around a sprocket wheel 20 on the shaft of the lower beater cylinder, and around sprocket wheel 21 on the shaft of the upper beater cylinder. The spreader drum is rotated from the lower beater cylinder by means of a sprocket chain 22 passing around a second sprocket wheel 23 on the shaft of the lower beater cylinder, and around a sprocket wheel 24 on the shaft of a spreader drum. Of course, it is manifest that other means than those shown may be employed for imparting rotation to the beater cylinders and the spreader drum, provided that they will all be rotated in the same direction as indicated by the several arrows.

Suitable means are provided in the wagon body for feeding the load of material rearwardly to the action of the beater mechanism. In the present case, the wagon body is provided with a slatted traveling bottom 25, driven by suitable connections from one of the ground wheels, so that in an advance of the machine, the load will be gradually fed rearwardly and the rear portion of the same presented to the action of the beater mechanism.

While my improved mechanism as hereinbefore described may be constructed as a permanent, complete, organized machine to spread straw, I prefer to construct the rack frame and the upper beater carried thereby as a separate unit adapted to be detachably applied to or removed from the wagon body of an ordinary manure spreader, so that the latter may be converted by the application of this unit, into a straw spreading machine, the frame increasing the holding capacity of the body, and the beater cylinder carried by said frame being in a position to act on the upper portion of the more bulky mass of straw, the hood being either carried as a permanent part of the unit or being detachable therefrom as desired.

In the foregoing description and accompanying drawings, I have set forth my invention in the particular detailed form which I prefer to adopt and which in practice has been found to answer to a satisfactory degree the ends to be attained. It is manifest, however, that these details may be variously changed and modified without departing from the spirit of my invention; and it will be understood that the invention is not limited to any particular form or construction of the parts except in so far as such limitations are specified in the claims.

Having thus described my invention, what I claim is:

1. In a straw spreader, the combination of a wagon body to hold the straw, upper and lower beaters at the rear end of the body, means sustained by the wagon body for feeding the body of straw rearwardly to the action of the beaters, a spreading device sustained by the body in rear of the lower beater in position to receive the material from the beaters, and a hood sustained by the body and provided with a rear wall extending in rear of the upper beater in position to direct the material from the two beaters to the spreading device and having side walls connected with the rear wall and extending at the ends of the upper beater.

2. In a straw spreader, the combination of a wagon body to hold the straw, upper and lower beaters at the rear end of the body, means sustained by the body for feeding the body of straw rearwardly to the action of the beaters, and a hood sustained by the body and provided with a rear wall and two connecting side walls, said walls extending around the upper beater in position to direct the material from the two beaters downwardly.

3. In a straw spreader, the combination of a wagon body to hold the straw, upper and lower beaters at the rear end of the body, means sustained by the body for feeding the body of straw rearwardly to the action of the beaters, a transversely extending spreading drum in rear of the lower beater rotatable about a horizontal transverse axis, and a hood sustained by the wagon body and extending in rear of the upper beater in position to direct the straw from the beaters to the spreading drum, the lower end of the hood terminating above the drum to permit the straw to be properly spread thereby.

4. In a straw spreader, the combination of a wagon body to hold the straw, upper and lower beaters at the rear end of the body, means sustained by the body for feeding the body of straw rearwardly to the action of the beaters, a transversely extending spreading drum in rear of the lower beater rotatable about a horizontal transverse axis, and a hood sustained by the body and having a rear wall and side walls extending respectively at the rear and sides of the upper beater and in position to direct the material from the two beaters to the spreading drum, said walls terminating at their lower ends above the spreading drum.

In testimony whereof I have affixed my signature hereto.

WILLARD J. COOK.